UNITED STATES PATENT OFFICE.

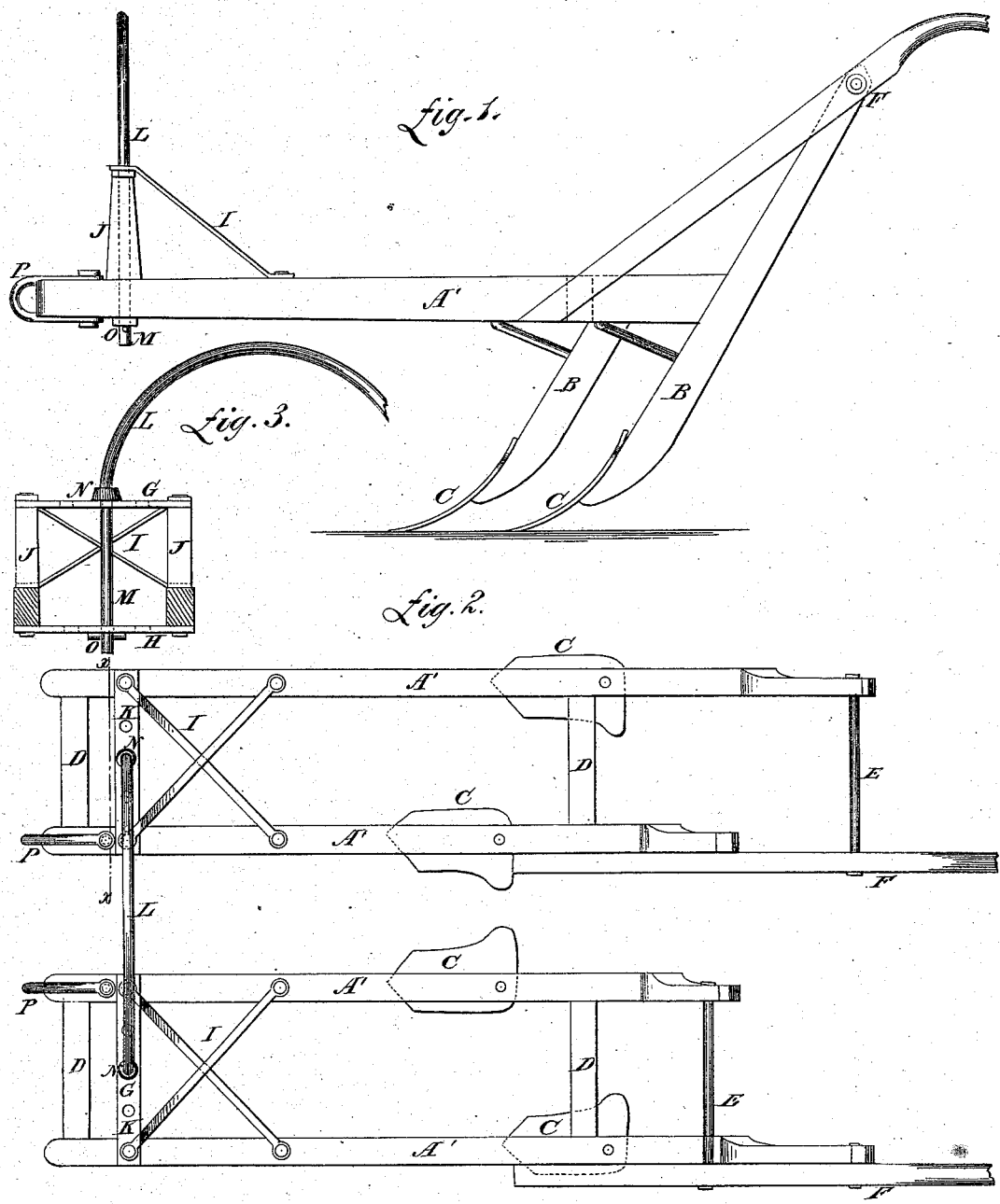

LINUS G. CLAWSON, OF PLEASANT HILL, MISSOURI.

IMPROVEMENT IN CORN-PLOWS.

Specification forming part of Letters Patent No. 162,798, dated May 4, 1875; application filed April 11, 1874.

*To all whom it may concern:*

Be it known that I, LINUS G. CLAWSON, of Pleasant Hill, in the county of Cass and State of Missouri, have invented a new and useful Improvement in Corn-Plows, of which the following is a specification:

The invention will first be fully described, and then pointed out in the claim.

Figure 1 is a side elevation. Fig. 2 is a top or plan view. Fig. 3 is a vertical section of Fig. 2, taken on the line $x\ x$.

Similar letters of reference indicate corresponding parts.

This implement is of peculiar construction, consisting of two plows of similar form connected together at the forward part by an adjustable bow, which allows the plows to be reversed without being disconnected.

Each plow A has two beams, A'. At the rear end of each beam is a standard or stock, B, to the lower end of which is attached a plow, C. These plows consist of a single piece, each formed something like a mold-board, with a shovel-point placed on the stocks a little inclined, so as to throw the soil laterally either inward or outward when the plow is in motion. The two beams of each plow are connected together by the cross-pieces D D, rods E E through the handle F, and by the plates G H and cross-braces I. The lower plate H is attached to the under side of the beams of each plow. The upper plate is support on the top of the stands J J, directly over the lower plate. These plates are provided with a series of holes, K. The holes in the upper plate are directly over the holes in the lower plate. L is a bow forming a semicircle above the upper plates. Its legs M M pass down through the holes K in the two plates of each plow.

N N are collars on the legs of the bow, which bear upon the upper plates. Through the lower ends of the bow pins O are placed. The bow is therefore confined in the plates by the collars and the pins; but by taking out the pins the legs may be changed to any of the holes, so that the plows can be spread or brought nearer together, as may be desired. By means of this bow the position of the plows may be reversed. The right-hand plow may be turned around and made the left-hand plow, and vice versa, thus placing the plows so that they will throw the earth to or from the plant. P are the clevises, which may be changed to suit the position of the plows. The crossed braces I are attached at one end to the beams, from which they extend in an inclined position to the tops of the upper plates over the stands J, where they are fastened by the same bolts which secure the plates to the stands.

I do not confine myself to the precise arrangement shown of the different parts, as variations may be made without departing from my invention.

Having thus described my invention, I claim as new and desire to secure by Letters Patent—

Two frames, A' A', carrying a gang of plows having their respective sets of mold-boards turned in opposite directions, in combination with the connecting-bow L, pivoted loosely to each, as shown and described, so that they may by simply turning, and without any adjustment, be made to turn the soil to or from a row of plants.

LINUS G. CLAWSON.

Witnesses:
T. H. MARSHALL,
J. A. AINSWORTH.